(12) United States Patent
Smith

(10) Patent No.: US 6,370,115 B1
(45) Date of Patent: Apr. 9, 2002

(54) ETHERNET DEVICE AND METHOD FOR APPLYING BACK PRESSURE

(75) Inventor: Alexander A. Smith, Carrollton, TX (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/150,311

(22) Filed: Sep. 9, 1998

(51) Int. Cl.[7] .................................................. H04L 5/14
(52) U.S. Cl. ...................... 370/230; 370/231; 370/410; 370/461; 370/462; 370/463
(58) Field of Search ................... 370/461, 462, 370/463, 445, 447, 446, 231, 230, 229, 236

(56) References Cited

U.S. PATENT DOCUMENTS

| | | | |
|---|---|---|---|
| 5,453,980 A | 9/1995 | Van Engelshoven | |
| 5,673,254 A | 9/1997 | Crayford | |
| 5,859,837 A | * 1/1999 | Crayford | ..................... 370/230 |
| 6,029,202 A | * 2/2000 | Frazier et al. | .............. 370/231 |
| 6,192,028 B1 | * 2/2001 | Simmons et al. | ........... 370/229 |

* cited by examiner

Primary Examiner—Salvatore Cangialosi
(74) Attorney, Agent, or Firm—Lisa K. Jorgenson; Christopher F. Regan

(57) ABSTRACT

An Ethernet device and the method for applying back pressure within an Ethernet communication network comprising the steps of asserting a back pressure pin of a media access control unit associated with a network communications port of an Ethernet device. In response to asserting the back pressure pin, only the back pressure continuous preamble of a packet is transmitted without a start-of-frame delimiter onto the network.

31 Claims, 6 Drawing Sheets

ETHERNET DEVICE AND METHOD FOR APPLYING BACK PRESSURE

FIELD OF THE INVENTION

This invention relates to Ethernet network systems, and more particularly, to the application of back pressure within an Ethernet communication network.

BACKGROUND OF THE INVENTION

Ethernet systems are increasingly more popular and are a type of local area network that is now a standard network implementation by a number of manufacturers and defined by the IEEE 802.3 standard. The Ethernet systems use a special low impedance coaxial cable or other media like twisted-pair wire in a tree configuration, where several hundred devices can be connected to a single length of cable. The capacity of the cable is shared among these devices by a protocol commonly known as carrier sensed multiple access with collision detection (CSMA/CD).

Ethernet was developed in the mid-1970s and forms the basis of the IEEE 802.3 specification. Thus, Ethernet and IEEE 802.3 LANs are almost identical. Both are broadcast networks that use the CSMA/CD (carrier sense multiple access with collision detection) MAC sublayer.

While the physical layer specification may vary, all IEEE 802.3 local area networks (LANs) consist of stations (end systems) connected to a common broadcast medium. Each station examines each successfully transmitted frame it has received to determine if it is the destination of the frame. The frame is copied or dropped accordingly. Before, transmitting, each station with a frame to transmit listens to the network, a process known as carrier sensing. If there is silence, the station transmits the frame. If the network is busy, the station waits until the network is silent before commencing transmission. Even with this "listening" function, two or more stations may start transmitting almost simultaneously and may collide with each other, creating a garbled signal. Stations must detect this garbled signal as a collision. Thus, these stations perform what is known as collision detection. A back-off algorithm is then used to reschedule the next attempted transmission of each station involved in the collision.

Ethernets with data rates of 10 Mb/s are the most common, but 100 Mb/s and 1 Gb/s are also available today. The common connector topology is an unshielded twisted pair (UTP, 10 BaseT standard, the maximum length from a station to a hub is 100 meters), connecting each station to a hub in a star topology. Unshielded twisted pair, shielded twisted pair or fiber optic lines can be used in 100 BaseT and 1000 BaseT networks.

A basic Ethernet hub is an Ethernet network device that emulates a bus by repeating a transmission from one station to all other stations. Thus, all stations connected to the hub can detect if the network is silent, or has an ongoing transmission or a collision. Hubs have become increasingly more sophisticated and some are functionally indistinguishable from sophisticated high-speed switches (i.e., they can switch packets between LAN ports simultaneously, so long as the destination ports do not collide).

A switched Ethernet hub connects multiple Ethernet ports, with each port designed as a separate segment, typically running at 10 Mbps. Often, several nodes transmit to a common destination, such as a file server. When this happens, packets can be dropped. Also, during periods of high data burst, the switch may run out of memory to receive ensuing packets. Switch manufacturers attempt to alleviate these bottleneck problems by providing large amounts of buffering on some ports, which increases the cost of the overall system. Other manufacturers are using back pressure and/or software flow control techniques to alleviate traffic congestion problems.

In many Ethernet controller designs, back pressure is implemented by generating a "fake" collision on the network, which forces the sending device to back off and attempt a retransmit after the back-off period. This, in turn, forces a throttling back of the LAN segment that is experiencing congestion. When the sending port attempts to try to transmit again, the congested port may force another "fake" collision or accept the incoming packet if congestion has been removed. Examples of Ethernet systems having collision systems include U.S. Pat. Nos. 5,673,254 and 5,453,980, the disclosures which are hereby incorporated by reference in their entirety.

Forcing collisions on the network as a back pressure/flow control technique is not desirable because network performance is dramatically impacted with each successive collision exponentially increasing the back-off period, and collision counts in the Ethernet controllers do not reflect just "normal" collisions, but the fake ones as well, misleading network administrators.

Software flow control methods are even less desirable since they consume CPU bandwidth and are difficult to implement. No Ethernet controller is known to be available that provides an intelligent and effective back pressure control method.

SUMMARY OF THE INVENTION

It is therefore an object of the present invention to provide an intelligent and effective back pressure control method in an Ethernet system that does not force collisions, and where network performance is not dramatically impacted.

In accordance with the present invention, the network device comprises a device having Quad-MAC addresses and flow-control by providing an intelligent flow-control/back pressure algorithm to each receive port. For each receive port, a back pressure input pin is asserted and causes only a preamble (i.e., without a start of frame delimiter field) to be transmitted (or driven) onto the network. In a preferred embodiment, the preamble will be asserted only if the line is idle or if the network device has started to transmit the preamble but has not transmitted the synch "11" bytes. The minimum size of the back pressure continuous preamble is 76 bytes to assure that all nodes on the network hear the back pressure limiting the collisions on the network to one. The minimum time is one slot time (64 bytes), plus the preamble time of eight bytes and jam time of four bytes.

In accordance with the present invention, the Ethernet device comprises a communication port that can be configured for half-duplex mode. A media access control (MAC) unit is associated with the communication port and provides interface signals for a physical network layer. The device transmits only a back pressure continuous preamble of a packet without a start-of-frame delimiter onto a network after receiving a back pressure signal and after waiting an interpacket gap time (IPG), when the port is only configured within the half-duplex mode.

The Ethernet device further comprises a back pressure input pin within the media access control unit, which when asserted, causes only the preamble without the starter frame delimiter to be forwarded onto the network. The media access control unit also comprises a plurality of system interface pins, including the back pressure input pin. The media access control unit comprises a Quad-MAC device. The device also comprises a FIFO and direct memory access (DMA) unit. The device has a FIFO mode and DMA mode and the media access control unit asserts the back pressure pin in a FIFO mode of operation. A host processor asserts the back pressure pin in a DMA-mode.

The minimum size of the back pressure continued preamble is about 76 bytes, and can comprise one slot time of 64 bytes, a preamble of eight bytes and a jam time of four bytes. The transmitted preamble terminates on byte boundaries.

In accordance with the present invention, the Ethernet communication network comprises a host system having a memory and an Ethernet device that shares the memory with the host system. The Ethernet device includes a communication port that can be configured for half-duplex mode. The communication port has a portion of shared memory allocated to the port. A media access control (MAC) unit is associated with the communication port and provides interface signals for a physical network layer. The device transmits only a continuous preamble of a packet without a starter frame delimiter onto the network after receiving a back pressure signal when the communication port is configured only within the half-duplex mode and after the allocated portion of memory has been substantially filled.

In accordance with the present invention, a method of the present invention applies back pressure within an Ethernet communication network and comprises the steps of asserting a back pressure pin of a media access control unit associated with the network communication port of an Ethernet device. In response to asserting the back pressure pin, only the continuous preamble is transmitted without a start-of-frame delimiter onto the network. The method also comprises the step of waiting an interval packet gap time before transmitting the back pressure continuous preamble. The interpacket gap time is about 96 bit times and the method also comprises the step of terminating transmitted preamble on byte boundaries. The method also comprises the step of transmitting a minimum of 608 preamble bits.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention is advantageous because it improves upon many prior art systems that provide a "fake" collision method in Ethernet systems. In the present invention, collisions are limited to a maximum of one when there is congestion, by virtue of a preamble being continuously driven as long as the back pressure is asserted. The present invention will be described with reference to the drawings. At first, a third mode of operation will be described where a preamble is asserted for a minimum of 76 preamble bytes and continues to do so whenever the back pressure signal is asserted. This mode is known as a "dumb" mode. A first and second mode will also be described with respect to flow charts shown in FIGS. 5 and 6.

Figure 1:
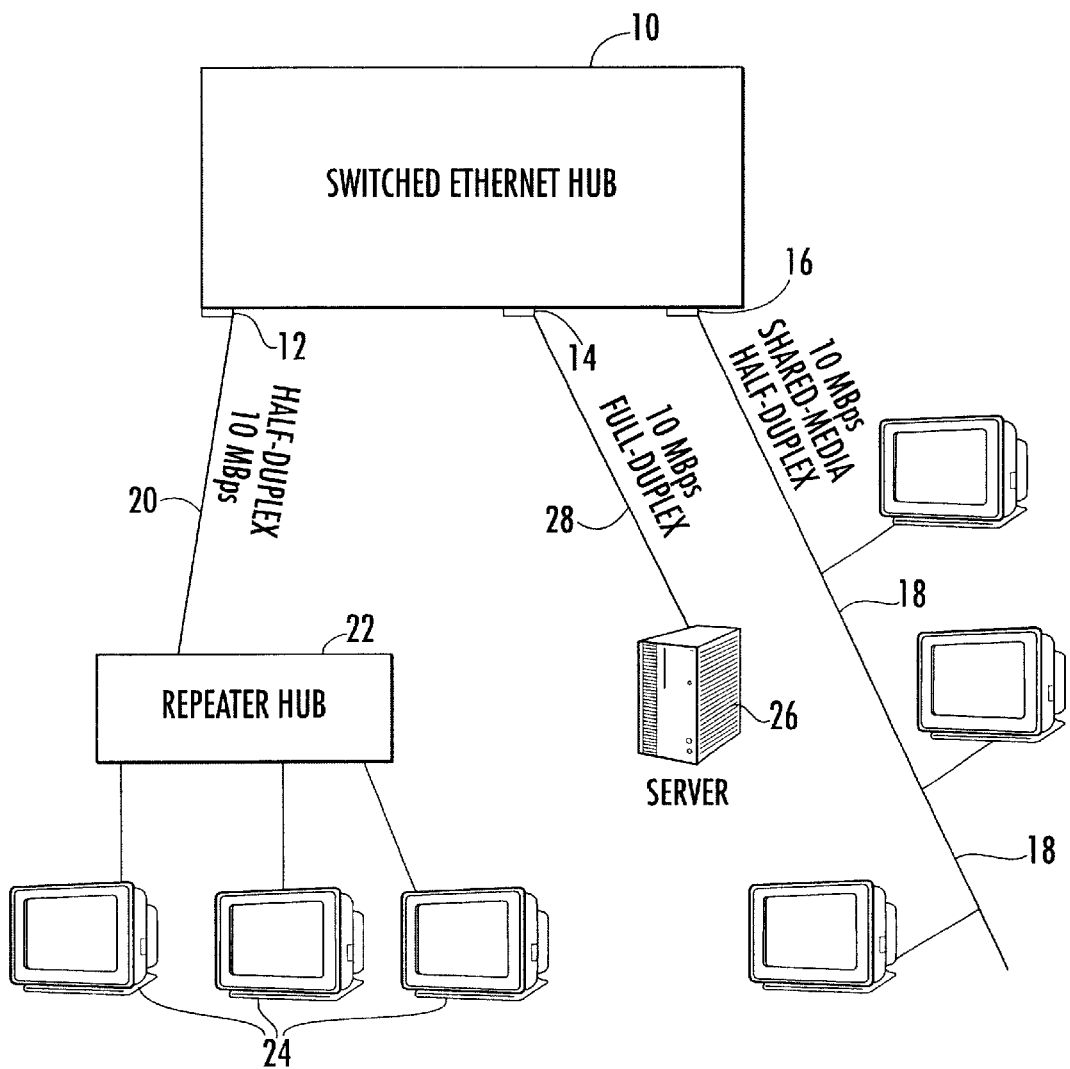
FIG. 1 is a schematic block diagram of a switched Ethernet hub configuration showing a switched Ethernet hub used as an Ethernet device and a repeater hub with a half-duplex communication line of 10 Mbps.

Referring now to FIG. 1, there is illustrated an example of a switched Ethernet hub having multiple Ethernet ports 12, 14 and 16. Each port acts as a separate channel segment that operates at ten megabytes per second (Mbps). The shared media line 18 operates at half-duplex, as well as the line 20 into the repeater hub 22, having the three terminals 24. The server 26 is shown connected by a full-duplex line 28 at ten Mbps line.

As noted before, several nodes sometimes transmit to a common destination, such as a file server or other switched hub, and when this happens, the total traffic on the destination port can exceed the Ethernet's 10 Mbps wire speed. This naturally would cause packets to be dropped. During periods of high burst, the switch may run out of memory to receive the ensuing packets.

Switch manufacturers attempt to alleviate these bottleneck problems by providing large amounts of buffering on some ports, which increase the total costs of the Ethernet devices. Other Ethernet systems sometimes use back pressure and/or software flow control techniques to alleviate the traffic congestion problems and generate "fake" collisions on the network. As noted before, these aforementioned problems are not advantageous and the present invention now addresses flow control by providing an intelligent flow control/back pressure algorithm to each port.

As is well known to those skilled in the art, each communication port has an associated media access control (MAC) unit, which provides interface signals for the physical network layer. In accordance with the present invention, a back pressure continuous preamble is transmitted without a start-of-frame delimiter onto a network, after receiving a back pressure signal, and after waiting an interpacket gap time (IPG) when the port is only configured in the half-duplex mode.

Figure 2:
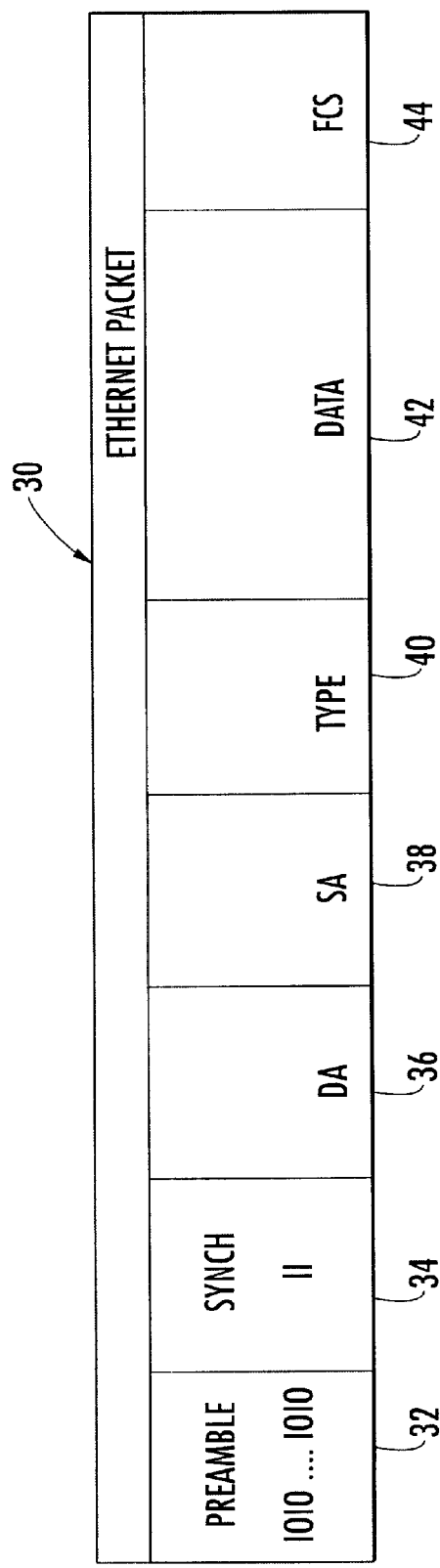
FIG. 2 is a diagram illustrating a standard format for an Ethernet packet and showing the preamble and the synchronization or "start-of-frame delimiter."

FIG. 2 illustrates an Ethernet packet 30 with the preamble 32 and synchronization 34, as well as the conventional destination address (DA) 36 and source address (SA) 38. The preamble sequence has an alternating "1" and "0" pattern, and can provide a single frequency on the network at the start of each frame. This allows a receiver to acquire and back onto the associated bit stream. A synch sequence 34, which is also referred to as a start-of-frame delimiter in IEEE 802.3 standards, follows the preamble. This delimiter 34 immediately delineates the start of the data portion of the message. For purposes of understanding, the term synch sequence will be interchangeable with the term start-of-frame delimiter, although Ethernet and IEEE 802.3 use different terms to delineate the start of the data portion.

As is well known, a media access control (MAC) unit associated with an Ethernet network device uses the destination address 36 to determine if any incoming packets are addressed to a particular node with which it is associated. If there is a match, then the device attempts to receive a packet. Any nodes having a media access control unit that does not detect a matching address would ignore the remainder of the packet.

The type field 40 is usually two bytes and includes the three different types of destination addressing supported by the various Ethernet standards (802.3) including individual, multicast and broadcast type, as is well known.

The data field 42 contains the packet data that is transferred between end stations and varies between 46 to 1,518 bytes. Naturally, the logical link control (LLC) function and layering is responsible for fragmenting data into block sizes for transmission over the network. The frame check sequence (FCS) 44 is a four-byte field that contains a cyclic redundancy check (CRC) for the entire frame.

Figure 3:
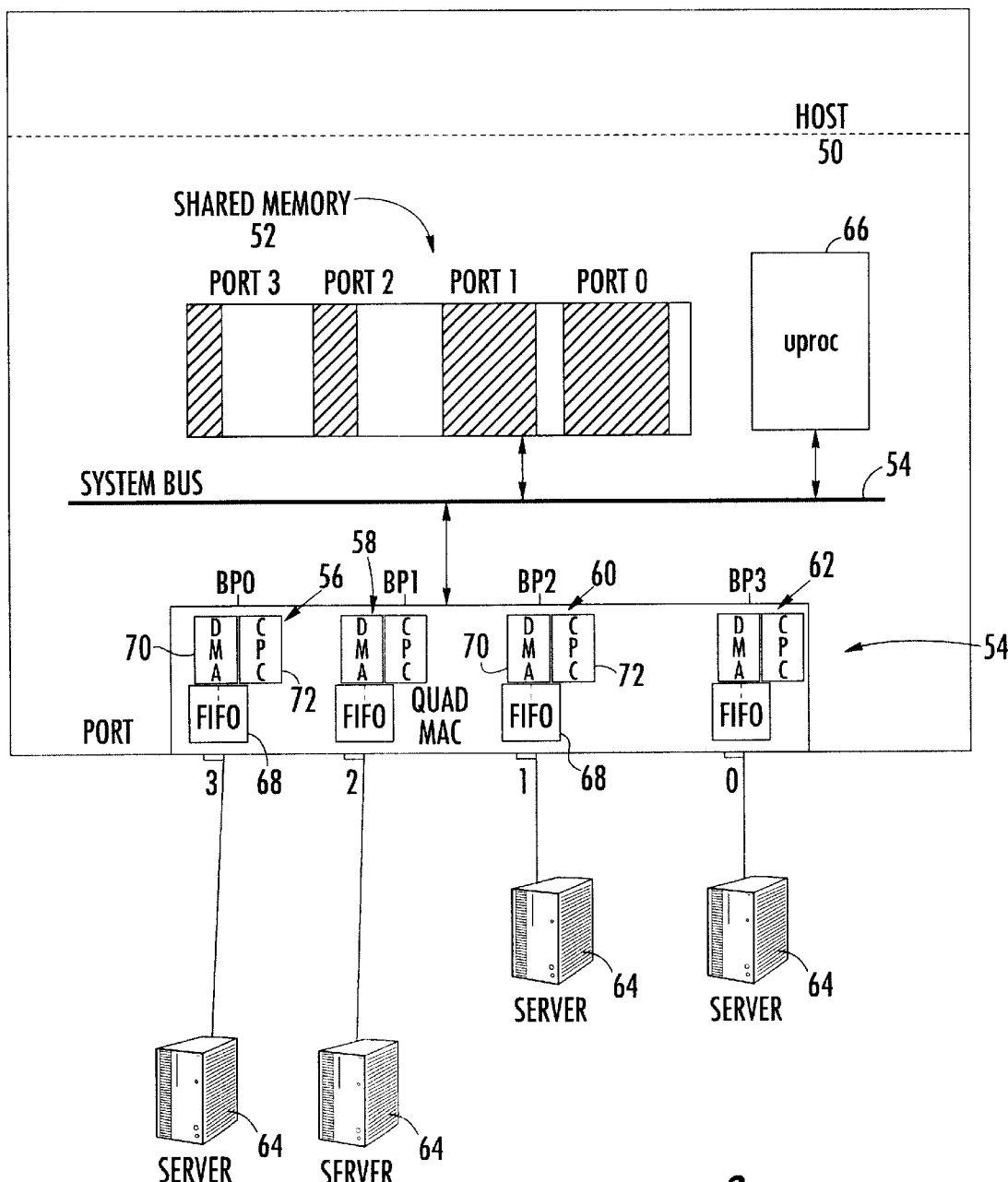
FIG. 3 is a simplified system showing multiple Quad-MAC devices with a shared memory of a host system and showing the system bus.

As shown in FIG. 3, a host system 50 includes a shared memory 52 that is common to an Ethernet network device 54 having Quad-MAC unit, which includes four media access control units 56–62 corresponding to four ports labeled 0, 1, 2 and 3. The shared memory 52 has allocated portions for the four communication ports as illustrated. Four servers 64 connect each of the ports 0–3. The host 50 also includes a processor 66. The four communication ports include FIFO memory 68, a direct memory access (DMA) unit 70, and communications processor (CPC) 72. The FIFO 68 can have transmit and receive FIFO. The communication ports can be receive/transmit ports, and can be configured as full duplex and half duplex. In the present invention, the receive ports are configured as half duplex. As known to those skilled in the art, the device can work in a FIFO mode, or in a DMA mode, when data is transferred through the DMA and through the system.

Figure 4:
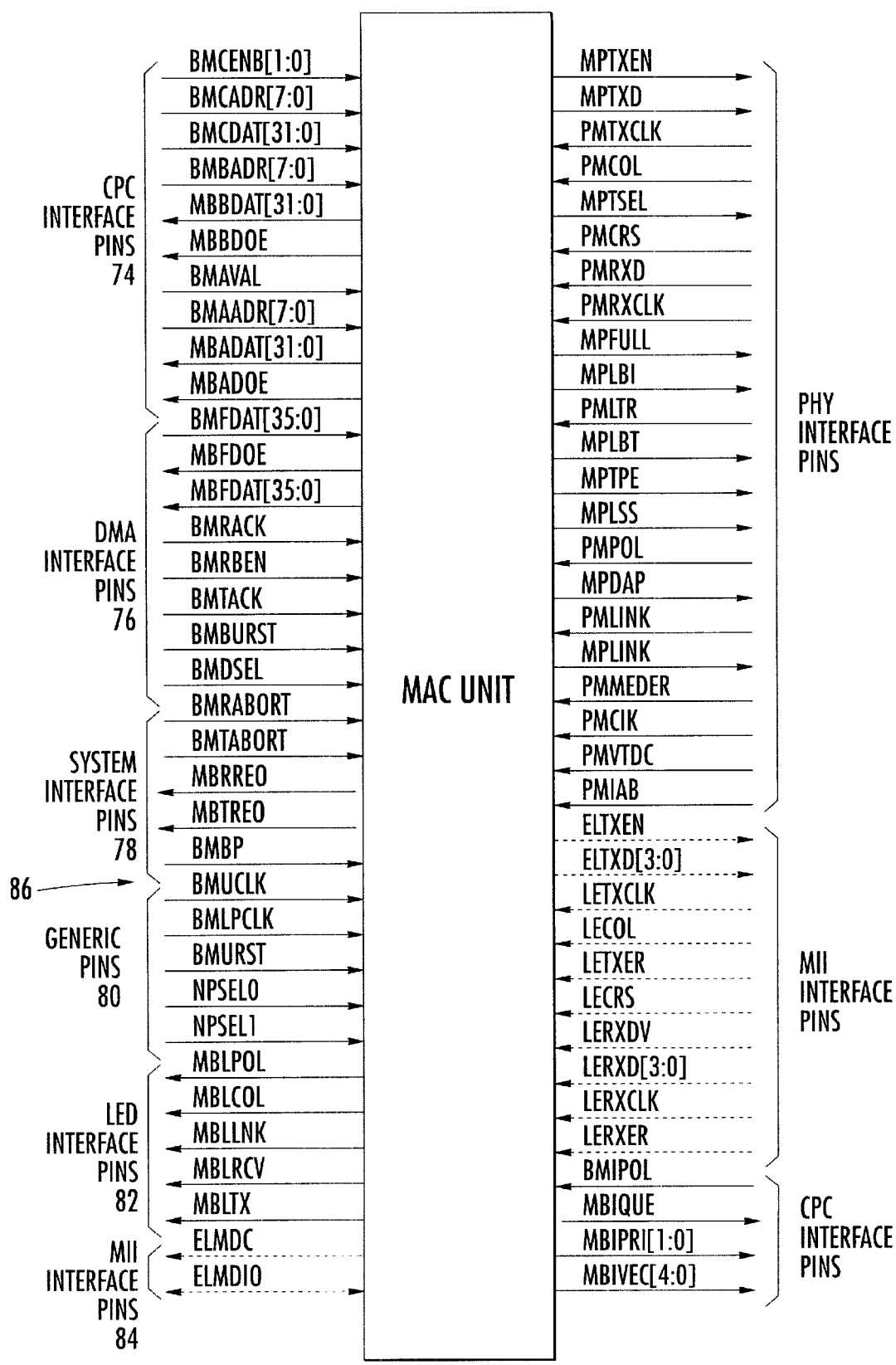
FIG. 4 is a MAC input/output pin description and showing a back pressure pin (BMMP) as part of the system interface pins.

FIG. 4 illustrates the input/output description for a media access control (MAC) unit 52–62, and shows communication processor interface pins 74, a DMA interface pins 76, system interface pins 78, generic pins 80, LED interface pins 82, and MII interface pins 84 common to the media access control unit. The BMPP pin indicated at line 86, corresponds to a back pressure pin. The network device provides for a back pressure control signal as inputs to a MAC receive unit. Each port includes a back pressure pin labeled as BP0, BP1, BP2 and BP3 as shown in FIG. 3. The back pressure input pin is asserted and causes the preamble to be transmitted onto the network.

It should be noted that only the preamble bits and no synchronization bits are transmitted. Preamble bits without the synchronization "11" bits do no harm because the MAC state machines within various Ethernet controllers and devices are searching for the synchronization bits. Thus, MAC state machines are not locked up after a preamble is removed. Either option causes a congested port to "buy" time until temporary congestion is relieved.

It should be understood that with one collision, the random back-off of a transmitting station is limited to one timed back-off period, minimizing the effect of back pressuring. Using the collision method, back-off periods can be more.

FIG. 3 illustrates a condition such as when certain allocated portions of memory are almost filled. The shading in ports 0 and 1 indicates a momentary condition within the Ethernet hub where ports 0 and 1 are close to using up their allocated portions of memory. Usually, software will determine the "critical point" at which back pressure will be asserted. It could be as simple as when there is only room for one more packet.

After this "critical point" is reached, the back pressure pin is asserted by the host 50 if the device is in a DMA mode or by the device itself if in the FIFO mode.

When this is set, the signal becomes a flow control signal to a MAC transmit state machine, and after the packet has been received by a MAC unit that is taxing the system resources, the MAC unit will wait the interpacket gap time of 96 bit times. It then starts transmitting continuous preamble without a starter frame delimiter corresponding to the synch "11" until the back pressure pin is deasserted, or a minimum of 608 preamble bits are transmitted. The transmitted preamble will terminate on byte boundaries.

Figure 5:
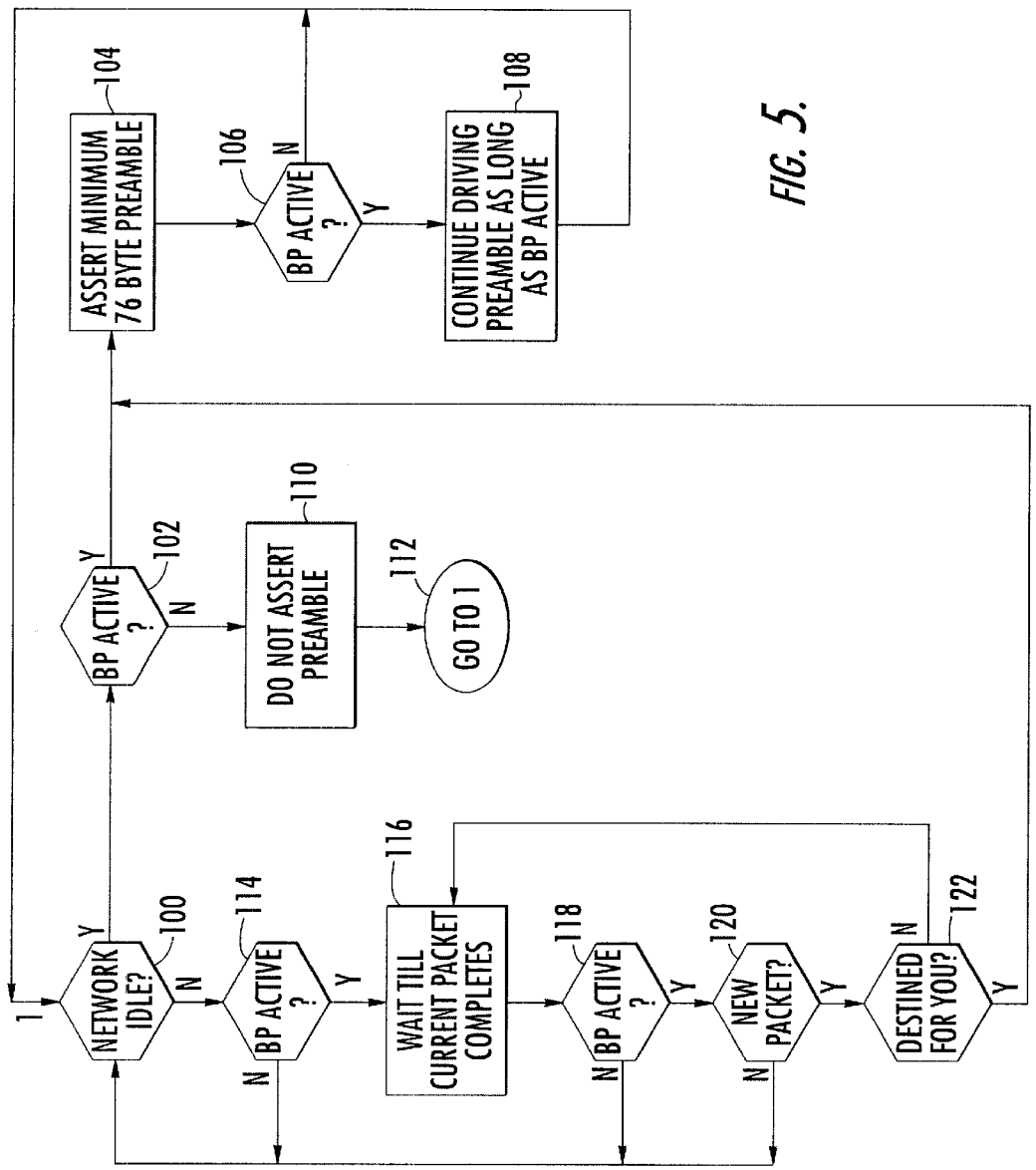
FIG. 5 is a flow chart showing a first mode of operation where collisions are avoided and all units on the system are held off until the back pressure is de-asserted.
Figure 6:
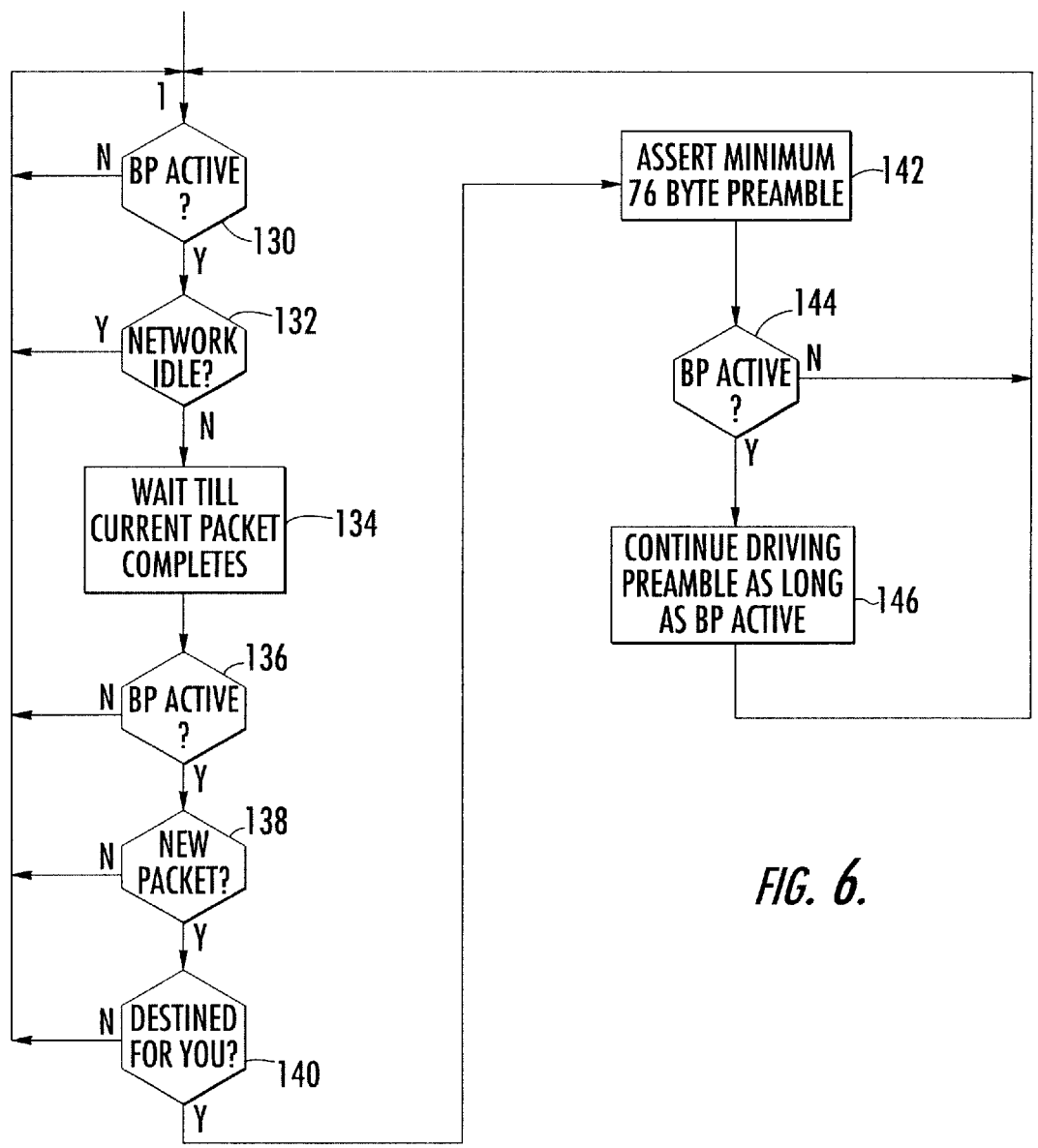
FIG. 6 is a flow chart illustrating a second mode where a unit waits for a destined packet and then drives the preamble and continues as long as the back pressure is active.

FIGS. 5 and 6 illustrate first and second modes of operation. In the first mode of operation shown in FIG. 5, if the network is idle and the back pressure is active, then the preamble can be asserted for the minimum 76 byte period and continue as long as the back pressure is active. This has the benefit of avoiding a collision entirely and holds everybody off until the back pressure is de-asserted. If the network is busy, then the current packet can be finished and a collision forced when the system knows that a packet is being transmitted for a particular device. Again, the collision is limited to one. This is intelligent in that only one collision is forced if the packet is actually for the particular device.

In the flow chart of FIG. 6, known as the second mode when the network is idle with the back pressure active, then nothing occurs. A device waits until a packet is destined for it, and then drives the preamble and continues as long as the back pressure is active.

For purposes of description, the flow charts are described with numbers starting in the 100 series.

As shown in FIG. 5 referring to the first mode, if the network is idle (block 100), then the back pressure (BP) is checked to determine if it is active (block 102). If the network has been found idle and the back pressure active, then a 76 byte preamble is the asserted minimum (block 104). The back pressure is checked to see if active (block 106) and if it is, then the preamble is continued to be driven as long as the back pressure is active (block 108). Then the loop again refers back to step one. If the back pressure in step one or two has not been active, then the preamble is not asserted in block 110 and then the system continues back to step one (block 112). If in step one the network is not idle, then the back pressure is checked to determine if active (block 114), and if it is, then the device waits until the current packet is completed (block 116). The back pressure is determined to see if it is active (block 118) and if it is, then the device checks to see if it is a new packet (block 120). If it is, it is determined to see if it is destined to the device (block 122).

Referring now to FIG. 6, the second mode is illustrated and referring once again to step one, if the back pressure is active at block 130, then the network is determined to see if it is idle at block 132. If the network is not idle, then the device waits until the current packet completes (block 134). If the back pressure is active at block 136, then the device determines if there is a new packet at block 138 and if it is destined for the device (or you) at block 140. If it is, then the minimum 76 byte preamble is asserted (block 142). If the back pressure is active (block 144), then the device continues driving the preamble as long as the back pressure is active (block 146). The device then completes the loop to step one as shown at the top left of FIG. 6. In each of the 5 decision steps, if there is an opposite answer, then step one is repeated.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. An Ethernet device comprising:

a communication port that can be configured for half-duplex mode;

a media access control (MAC) unit associated with the communication port that provides interface signals for a physical network layer; and means for transmitting a continuous preamble of a packet without a start of frame delimiter onto a network after receiving a back pressure signal and after waiting an interpacket gap time (IPG), when the port is configured only within the half-duplex mode, wherein the preamble is transmitted in one of two modes of operation, a first mode of operation where if the network is idle and back pressure active, then the preamble is asserted for a minimum "n" byte period and continues as long as the back pressure is active to avoid a collision until back pressure is de-asserted, and a second mode of operation where the network is idle with the back pressure active such that nothing occurs, and a device waits for a packet destined for the device while the preamble is driven and continues as long as the back pressure is active.

2. A device according to claim 1, and further comprising a back pressure input pin within the media access control unit, which when asserted, causes only the preamble without the start of frame delimiter to be forwarded onto the network.

3. A device according to claim 1, and wherein said media access control unit comprises a plurality of system interface pins, including said back pressure input pin.

4. A device according to claim 1, wherein said media access control unit comprises a Quad-MAC device.

5. A device according to claim 1, and further comprising a FIFO and direct memory access (DMA) unit, said device having a FIFO mode and DMA mode, and wherein said media access control unit asserts the back pressure pin in a FIFO mode of operation and a host processor asserts the back pressure pin in a DMA mode.

6. A device according to claim 1, wherein the minimum size of the back pressure continuous preamble is 76 bytes to assure that a maximum number of nodes on a network hear the back pressure and limit collisions to one.

7. A device according to claim 1, wherein the back pressure continuous preamble comprises a minimum of one slot time of 64 bytes, plus a preamble of 8 bytes and a jam time of 4 bytes.

8. A device according to claim 1, wherein the transmitted preamble terminates on byte boundaries.

9. An Ethernet device comprising:

a plurality of receive ports;

a media access control (MAC) unit associated with each of said communication ports to provide interface signals for a physical network layer through the communication port, wherein said media access control unit can be configured with a half-duplex mode; and means for transmitting only a continuous preamble of a packet without a start of frame delimiter onto a network after receiving a back pressure signal and waiting a interpacket gap time (IPG) when the media access control receive unit is only within the half-duplex mode, wherein the preamble is transmitted in one of two modes of operation, a first mode of operation where if the network is idle and back pressure active, then the preamble is asserted for a minimum "n" byte period and continues as long as the back pressure is active to avoid a collision until back pressure is de-asserted, and a second mode of operation where the network is idle with the back pressure active such that nothing occurs, and a device waits for a packet destined for the device while the preamble is driven and continues as long as the back pressure is active.

10. A device according to claim 9, and further comprising a back pressure input pin within the media access control unit, which when asserted, causes only the preamble without the start of frame delimiter to be forwarded onto the network.

11. A device according to claim 9, and wherein said media access control unit comprises a plurality of system interface pins, including said back pressure input pin.

12. A device according to claim 9, wherein said media access control unit comprises a Quad-MAC device.

13. A device according to claim 9, wherein said media access control receive unit further comprises a receive port having a FIFO memory and a direct memory access (DMA) unit, said device having a FIFO mode and DMA mode, and wherein said media access control unit asserts the back pressure pin in a FIFO mode of operation and a host processor asserts the back pressure pin in a DMA mode.

14. A device according to claim 9, wherein the minimum size of the back pressure continuous preamble is 76 bytes to assure that a maximum number of nodes on a network hear the back pressure and limit collisions to one.

15. A device according to claim 9, wherein the back pressure continuous preamble comprises one slot time of 64 bytes, a preamble of 8 bytes and a jam time of 4 bytes.

16. A device according to claim 9, wherein the transmitted preamble terminates on byte boundaries.

17. An Ethernet communication network comprising:

a host system having a memory; and an Ethernet device that shares the memory with the host system, said Ethernet device comprising:

a communication port that can be configured for half-duplex mode, wherein said communication port has a portion of shared memory allocated to the port;

a media access control (MAC) unit associated with the communication port that provides interface signals for a physical network layer; and means for transmitting only a back pressure continuous preamble of a packet without a start of frame delimiter onto a network after receiving a back pressure signal when the communication port is configured only within the half-duplex mode and after the allocated portion of memory has been substantially filled, wherein the preamble is transmitted in one of two modes of operation, a first mode of operation where if the network is idle and back pressure active, then the preamble is asserted for a minimum "n" byte period and continues as long as the back pressure is active to avoid a collision until back pressure is de-asserted, and a second mode of operation where the network is idle with the back pressure active such that nothing occurs, and a device waits for a packet destined for the device while the preamble is driven and continues as long as the back pressure is active.

18. A device according to claim 17, and further comprising a back pressure input pin within the media access control unit, which when asserted, causes only the preamble without the start of frame delimiter to be forwarded onto the network.

19. A device according to claim 17, and wherein said media access control unit comprises a plurality of system interface pins, including said back pressure input pin.

20. A device according to claim 17, wherein said media access control unit comprises a Quad-MAC device.

21. A device according to claim 17, and further comprising a FIFO and direct memory access (DMA) unit, said device having a FIFO mode and DMA mode, and wherein said media access control unit asserts the back pressure pin in a FIFO mode of operation and a host processor asserts the back pressure pin in a DMA mode.

22. A device according to claim 17, wherein the minimum size of the back pressure continuous preamble is 76 bytes to assure that a maximum number of nodes on a network hear the back pressure and limit collisions to one.

23. A device according to claim 17, wherein the back pressure continuous preamble comprises one slot time of 64 bytes, a preamble of 8 bytes and a jam time of 4 bytes.

24. A device according to claim 17, wherein the transmitted preamble terminates on byte boundaries.

25. A method for applying back pressure within an Ethernet communication network comprising the steps of:

asserting a back pressure pin of a media access control unit associated with a network communication port of an Ethernet device; and in response to asserting the back pressure pin, transmitting only back pressure continuous preamble of a packet without a start-of-frame delimiter onto the network, and transmitting the preamble in one of two modes of operation, a first mode of operation where if the network is idle and back pressure active, then asserting the preamble for a minimum "n" byte period and continuing as long as the back pressure is active to avoid a collision until back pressure is de-asserted, and a second mode of operation where the network is idle with the back pressure active such that nothing occurs and waiting by a device for a packet destined for the device and driving the preamble and continuing as long as the back pressure is active.

26. A method according to claim 25, and further comprising the step of waiting an interval packet gap time before transmitting the back pressure continuous preamble.

27. A method according to claim 26, wherein the interval packet gap time is about 9.6 microseconds.

28. A method according to claim 25, and further comprising the step of terminating the transmitted preamble on byte boundaries.

29. A method according to claim 25, and further comprising the step of transmitting a minimum of 608 preamble bits.

30. A method according to claim 25, and wherein the back pressure continuous preamble comprises one time slot of 64 bytes, a preamble of 8 bytes and a jam time of 4 bytes.

31. A method for applying back pressure to an Ethernet communication network comprising the steps of:

generating a back pressure signal, and in response to the signal;

asserting a back pressure pin of a media access control unit associated with a network port of an Ethernet device; and in response to asserting the back pressure pin transmitting only back pressure continuous preamble of a packet without a start-of-frame delimiter onto a network, and transmitting the preamble in one of two modes of operation, a first mode of operation where if the network is idle and back pressure active, then asserting the preamble for a minimum "n" byte period and continuing as long as the back pressure is active to avoid a collision until back pressure is de-asserted, and a second mode of operation where the network is idle with the back pressure active such that nothing occurs and waiting by a device for a packet destined for the device and driving the preamble and continuing as long as the back pressure is active.

* * * * *